United States Patent
Chilumukuru et al.

(10) Patent No.: US 11,517,846 B2
(45) Date of Patent: Dec. 6, 2022

(54) SYSTEMS AND METHODS FOR CLEANING PARTICULATE FILTERS

(71) Applicant: CUMMINS INC., Columbus, IN (US)

(72) Inventors: Krishna Pradeep Chilumukuru, Columbus, IN (US); Todd M. Wieland, Columbus, IN (US); Luis Fernando Loo Zazueta, San Luis Potosi (MX)

(73) Assignee: Cummins Inc., Columbus, IN (US)

( * ) Notice: Subject to any disclaimer, the term of this patent is extended or adjusted under 35 U.S.C. 154(b) by 296 days.

(21) Appl. No.: 16/786,662

(22) Filed: Feb. 10, 2020

(65) Prior Publication Data

US 2020/0261838 A1    Aug. 20, 2020

Related U.S. Application Data

(60) Provisional application No. 62/805,678, filed on Feb. 14, 2019.

(51) Int. Cl.
*B01D 46/681* (2022.01)
*B01D 46/24* (2006.01)
(Continued)

(52) U.S. Cl.
CPC .......... *B01D 46/681* (2022.01); *B01D 41/04* (2013.01); *B01D 46/2418* (2013.01);
(Continued)

(58) Field of Classification Search
CPC .... B01D 41/04; B01D 46/04; B01D 46/2418; B01D 46/42; B01D 46/681; B01D 46/71;
(Continued)

(56) References Cited

U.S. PATENT DOCUMENTS

| 4,077,781 A | 3/1978 | Sundstrom |
| 4,544,389 A | 10/1985 | Howeth |

(Continued)

FOREIGN PATENT DOCUMENTS

| CN | 102712018 A | 10/2012 |
| CN | 106050364 | 10/2016 |

(Continued)

OTHER PUBLICATIONS

JP2004156500A_ENG (Espacenet machine translation of Iida) (Year: 2004).*

(Continued)

*Primary Examiner* — Gabriel E Gitman
(74) *Attorney, Agent, or Firm* — Foley & Lardner LLP

(57) ABSTRACT

A method for cleaning a particulate matter filter is discussed. The particulate filter can include an inlet and an outlet, where the outlet includes openings to a plurality of outlet channels, and the inlet includes openings to a plurality of inlet channels. The outlet channels and the inlet channels are separated by a filer barrier. A fluid nozzle is positioned in contact with the outlet of the particulate filter over a first set of outlet channels. Fluid form the fluid nozzle is injected into the first set of outlet channels. While injecting the fluid, the position of the fluid nozzle is changed such that the fluid nozzle is positioned over a second set of outlet channels.

20 Claims, 7 Drawing Sheets

(51) Int. Cl.
  *B01D 46/71* (2022.01)
  *F01N 3/023* (2006.01)
  *B01D 41/04* (2006.01)

(52) U.S. Cl.
  CPC .......... *B01D 46/71* (2022.01); *B01D 2273/14* (2013.01); *B01D 2279/30* (2013.01)

(58) Field of Classification Search
  CPC ............ B01D 2273/14; B01D 2279/30; F01N 3/02; F01N 3/023; F01N 3/0233; F01N 3/0237; F01N 3/0293
  See application file for complete search history.

(56) References Cited

U.S. PATENT DOCUMENTS

| | | | |
|---|---|---|---|
| 7,326,265 B2 | 2/2008 | Zilliox et al. | |
| 7,357,829 B2 | 4/2008 | Ehlers | |
| 7,410,530 B2 | 8/2008 | Wagner et al. | |
| 8,256,060 B2 | 9/2012 | Wagner et al. | |
| 8,273,185 B2 | 9/2012 | Milles et al. | |
| 8,568,536 B2 | 10/2013 | Meister et al. | |
| 9,550,217 B2 | 1/2017 | Wieland et al. | |
| 2004/0103788 A1* | 6/2004 | Streichsbier | B01D 41/04 95/279 |
| 2005/0011357 A1 | 1/2005 | Crawley | |
| 2008/0083334 A1 | 4/2008 | Bardhan et al. | |
| 2009/0056288 A1* | 3/2009 | Waldo | B01D 41/04 134/22.12 |
| 2010/0319731 A1 | 12/2010 | Spruegel et al. | |
| 2011/0146721 A1* | 6/2011 | Meister | F01N 3/0237 134/22.1 |
| 2012/0266918 A1 | 10/2012 | Hakansson | |
| 2016/0208981 A1* | 7/2016 | Kaesemeyer | E01H 1/101 |
| 2016/0326926 A1 | 11/2016 | Kahlert | |
| 2017/0211440 A1* | 7/2017 | Salsgiver | F01N 3/023 |
| 2018/0128137 A1 | 5/2018 | Case et al. | |

FOREIGN PATENT DOCUMENTS

| | | | |
|---|---|---|---|
| CN | 106703943 | 5/2017 | |
| CN | 108979797 | 12/2018 | |
| EP | 2 500 078 A2 | 9/2012 | |
| EP | 2 716 344 B1 | 6/2018 | |
| JP | H436008 | 2/1992 | |
| JP | 2004156500 A * | 6/2004 | ............ B01D 41/04 |
| WO | WO-2008/054262 A1 | 5/2008 | |
| WO | WO2008054262 A1 * | 5/2008 | ............ F01N 3/023 |
| WO | WO2011058556 A2 * | 5/2011 | ............ B08B 5/04 |
| WO | WO-2011058556 A2 * | 5/2011 | ............ B08B 5/04 |
| WO | WO-2017/144301 A1 | 8/2017 | |

OTHER PUBLICATIONS

Office Action for CN Application No. 2019108103259, dated Jul. 19, 2021.

Third Office Action for CN Application No. 201910810325.9, dated Jun. 7, 2022.

* cited by examiner

SYSTEMS AND METHODS FOR CLEANING PARTICULATE FILTERS

CROSS-REFERENCE TO RELATED APPLICATIONS

This application claims the benefit of and priority to U.S. Provisional Patent Application No. 62/805,678, filed Feb. 14, 2019, the content of which is incorporated by reference in its entirety.

TECHNICAL FIELD

The present application relates generally to systems and methods for cleaning particulate filters such as diesel particulate filters.

BACKGROUND

Internal combustion engines are typically coupled to aftertreatment systems for filtering exhaust gases generated by the engines. For example, a particulate filter, e.g., a diesel particulate filter (DPF) can be positioned in the exhaust path to filter particulate matter in the exhaust gas prior to discharging the exhaust gas into the atmosphere.

SUMMARY

In one embodiment, a method is provided for cleaning a particulate filter having an outlet and an inlet. The outlet includes openings to a plurality of outlet channels. The inlet including openings to a plurality of inlet channels. The outlet channels are separated from the inlet channels by a filter barrier. The method comprises positioning a fluid nozzle in contact with the outlet of the particulate filter over a first set of outlet channels. The method further includes injecting fluid from the fluid nozzle into the first set of outlet channels.

In another embodiment, a method is provided for cleaning a particulate filter having an outlet and an inlet. The outlet includes openings to a plurality of outlet channels, and the inlet includes openings to a plurality of inlet channels. The outlet channels are separated from the inlet channels by a filter barrier. The method includes positioning a first fluid nozzle in contact with the outlet of the particulate filter over a first set of outlet channels. The method further includes positioning a second fluid nozzle adjacent to the inlet of the particulate filter over a first inlet channel. A first fluid is injected from the first fluid nozzle into the first set of outlet channels, and a second fluid is injected from the second fluid nozzle into the first inlet channel.

In yet another embodiment, a system comprises a filter housing. The filter housing has a top portion and a bottom portion. The filter housing is configured to surround a particulate filter having an outlet and an inlet. The outlet includes openings to a plurality of outlet channels, and the inlet includes openings to a plurality of inlet channels. The outlet channels are separated from the inlet channels by a filter barrier. A platform is coupled to the bottom portion, the platform defining an opening adjacent to the inlet when the particulate filter is surrounded by the housing. A first fluid nozzle is positionable adjacent to the outlet, the first fluid nozzle in fluid communication with a first fluid source. A second fluid nozzle is positionable adjacent to the inlet, the second fluid nozzle in fluid communication with a second fluid source.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for cleaning aftertreatment systems of an internal combustion engine system. The various concepts introduced above and discussed in greater detail below may be implemented in any of a number of ways, as the described concepts are not limited to any particular manner of implementation. Examples of specific implementations and applications are provided primarily for illustrative purposes.

A DPF can comprise a filter encased in a canister that is positioned in an exhaust stream of a diesel engine. The DPF is designed to collect particulate matter while allowing exhaust gases to pass through. Over time, the DPF can become overloaded or saturated with particulate matter, resulting in a reduction in filtering performance and an increase in undesirable backpressure along the exhaust stream. To reduce DPF saturation, the DPF can be cleaned to remove the particulate matter. In one approach, the DPF canister can be mounted in a chamber having an inlet and an outlet Fluids such as air, water or other types of gas or liquids can be injected under pressure into the inlet or outlet and extracted at the other end. The fluid can pass through the DPF and displace the particulate matter bound to sidewalls of the substrate or accumulated as a plug in the DPF. However, such an approach may require large compressors and/or pumps to generate high volumetric flow and pressurized liquid jets to effectively clean the DPF.

As discussed below, a method for cleaning a DPF is provided. The method includes using a nozzle in direct contact with an outlet or downstream end of the DPF. Fluids such as air or water or other types of gases or liquids can be injected through the nozzle and into the outlet of the DPF. Because the nozzle is positioned close to and at times in contact with the outlet of the DPF, a relatively lower pressure and flow of air or liquid is needed to displace the particulate matter from within the DPF. The position of the nozzle can be moved in relation to the surface area of the face of the DPF, such that the entire face of the DPF is treated with the fluid.

Figure 1:
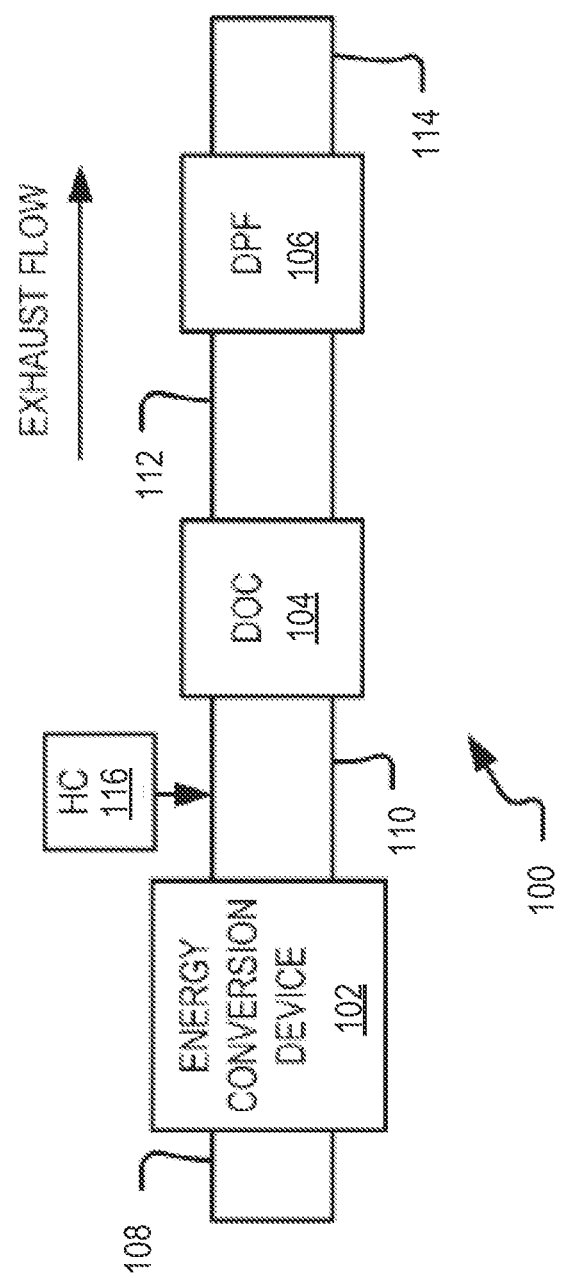
FIG. 1 shows an example exhaust aftertreatment system according to an example embodiment.

FIG. 1 shows an example exhaust aftertreatment system 100 fluidly coupled downstream of an energy conversion device 102, such as, for example, a diesel engine, a turbine or a turbocharger. The exhaust aftertreatment system 100 includes a diesel oxidation catalyst (DOC) 104 positioned downstream of the energy conversion device 102 and a DPF 106 positioned downstream of the DOC 104. The energy conversion device 102, the DOC 104, and the DPF 106 are fluidly connected via exhaust gas conduits 108, 110, 112, and 114. Additional elements can be included in the aftertreatment system 100, such as, for example, a selective catalytic reduction (SCR) system (not shown) positioned downstream of the DOC 104 and the DPF 106. In the embodiment of FIG. 1, a hydro-carbon (HC) loser 116 is provided in the exhaust gas conduit segment 110 between the energy conversion device 102 and the DOC 104 to inject fuel into the exhaust gas flow, for example, during an active regeneration cycle of the DPF 106.

Figure 2:
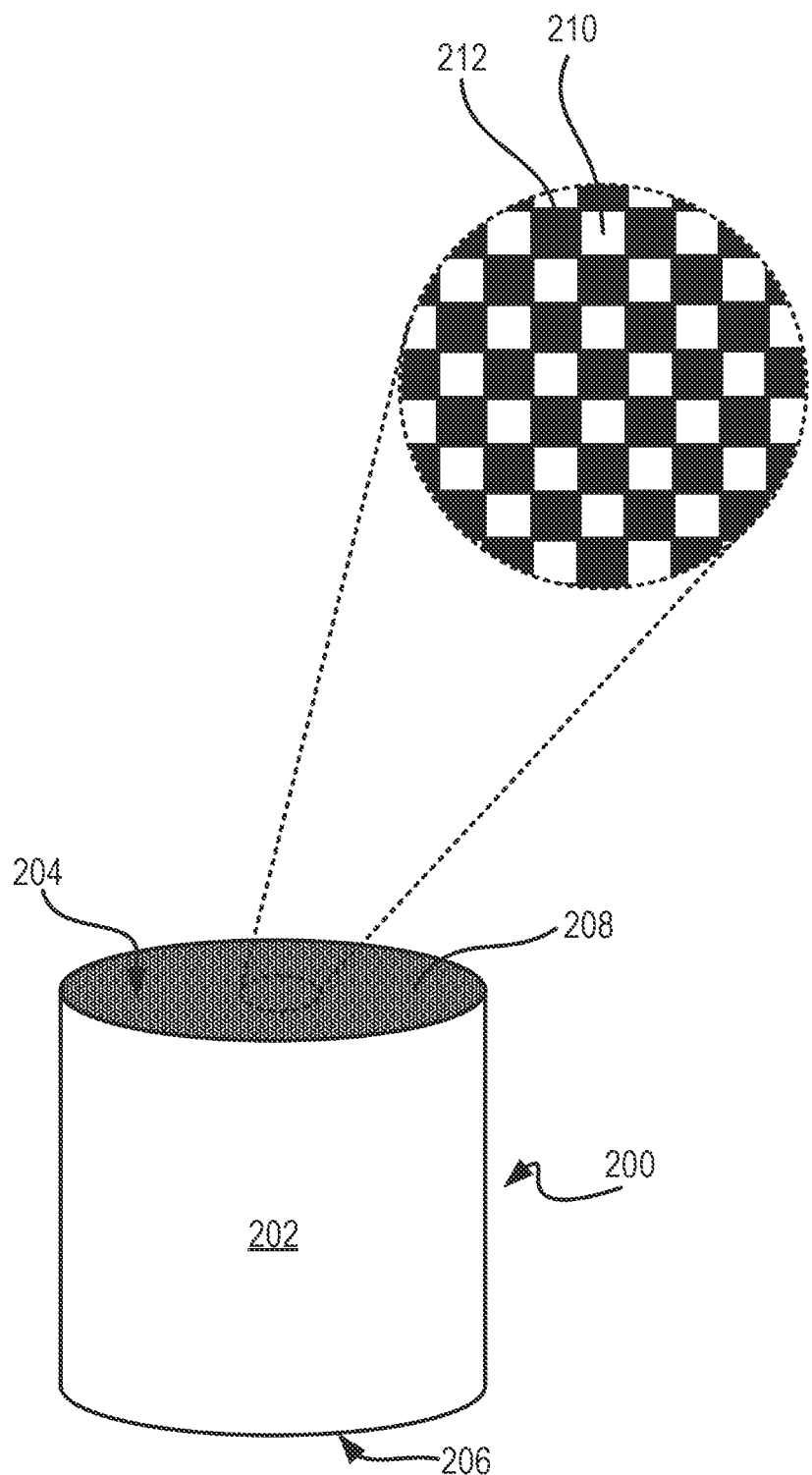
FIG. 2 shows an example DPF canister according to an example embodiment.

FIG. 2 shows an example DPF canister 200. The DPF canister 200 can be used to implement the DPF 106 shown in FIG. 1. For example, the DPF canister 200 can be positioned in a housing having an inlet and an outlet, where the inlet is coupled to the exhaust gas conduit segment 112 and the outlet is coupled to the exhaust gas conduit segment 114 shown in FIG. 1. The DPF canister 200 can include a DPF housing 202 containing a DPF filter structure 204. The DPF housing 202 shown in FIG. 2 has a hollow cylindrical shape having a circular cross-section. However, the DPF housing 202 can have a shape other than circular cross-sectional shape shown in FIG. 1, such as, for example, a rectangular, elliptical, or polygonal (regular and irregular) shape. The DPF filter structure 204 can be fitted within the DPF housing 202. In some instances, the DPF filter structure 204 can be press fit within the DPF housing 202, such that the DPF filter structure 204 is positioned to make contact with an inner sidewall of the DPF housing 202.

The DPF filter structure 204 has an inlet or upstream end 206 and an outlet or downstream end 208. The inlet 206 can include a number of openings into inlet channels, while the outlet 208 can include a number of openings into outlet channels. Within the DPF filter structure 204, the inlet channels and the outlet channels can be separated by permeable filter sidewalls. During operation, the exhaust gas is directed through the openings into the inlet channels. The exhaust gas passes through the sidewalls between the inlet channels and the outlet channels, while particulate matter is obstructed by the sidewalls. Thus, the particulate matter is accumulated predominantly within the inlet channels of the DPF filter structure 204.

FIG. 2 shows an expanded view of a portion of the outlet 208 the DPF filter structure 204. The outlet 208 of the DPF filter structure 204 includes a plurality of outlet channel openings 210 and a plurality of inlet channel barriers 212. The outlet channel openings 210 open into respective outlet channels, while the inlet channel barriers 212 form a barrier to the inlet channels (not shown). While not shown in FIG. 2, the inlet 206 can include a plurality of inlet channel openings and a plurality of outlet channel barriers. The inlet channel openings open into respective inlet channels, and the outlet channel barriers form a barrier to the outlet channels. The outlet channel openings 210 and the inlet channel barriers 212 are arranged in a grid form. In some examples, the inlet channels and the outlet channels can be arranged in a honeycomb fashion. In some examples, a fraction of the channels can be flow through and thereby behave as both inlet and outlet channels.

Figure 3:
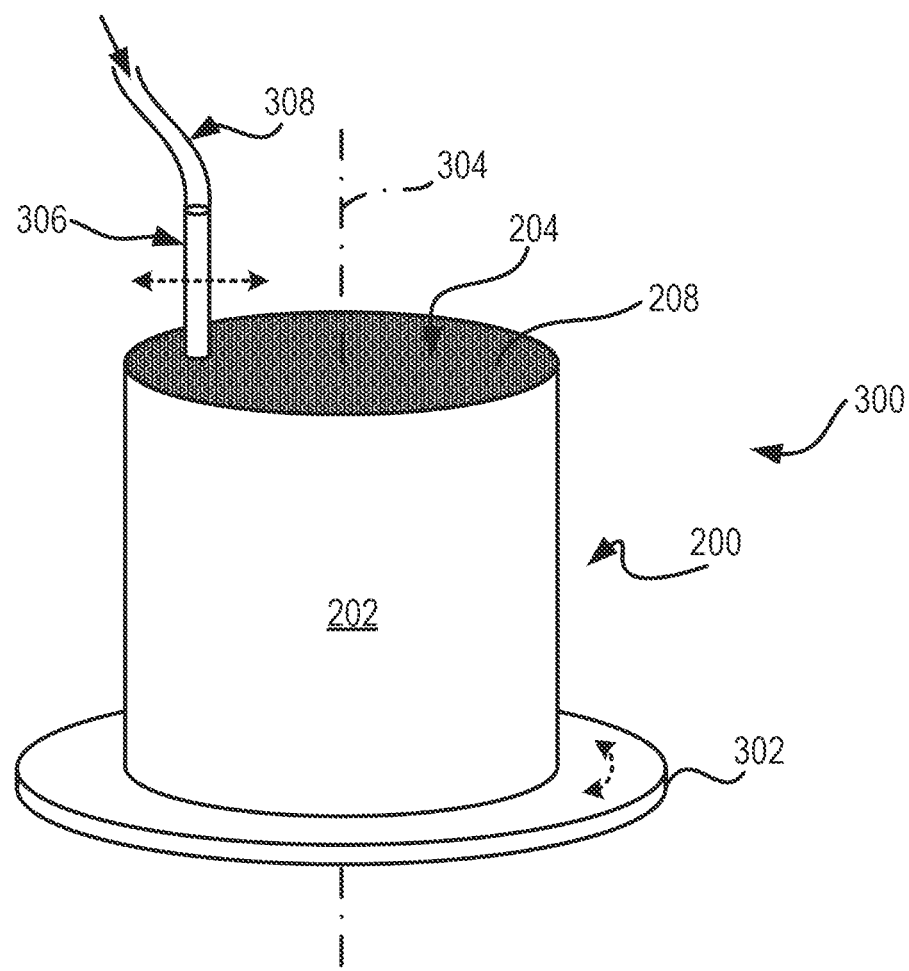
FIG. 3 shows a system for cleaning a DPF filter structure according to an example embodiment.

FIG. 3 shows a system 300 for cleaning the DPF filter structure 204. The system includes a platform 302 on which the DPF canister 200 is positioned. A fluid nozzle 306 is positioned over the outlet 208 of the DPF filter structure 204, i.e., such that the fluid nozzle 306 is in contact with the outlet 208. The platform 302 can rotate about a longitudinal axis 304. The DPF canister 200 may be positioned on the platform 302 such that a center of the DPF filter structure 204 is substantially collinear with the longitudinal axis 304. The platform 302 has an opening that provides access to the inlet 206 of the DPF filter structure 204. For example, the opening can have a diameter that is at least 90% of the diameter of the DPF filter structure 204. The platform 302 can be coupled to the periphery of the DPF housing 202 at the inlet 206 of the DPF filter structure 204. The platform 302 can be rotated using, for example, a belt or gear drive coupled to an electric motor. In some instances, the platform 302 can be rotated at a speed between 5 rpm and 15 rpm, although other rotational speeds are possible.

The fluid nozzle 306 can be moved radially over the outlet 208 between the outer periphery and a center of the DPF filter structure 204. The combination of the rotating motion of the DPF filter structure 204, imparted by the platform 302, and the radial motion of the fluid nozzle 306 can allow coverage of the entire outlet 208. For example, the fluid nozzle 306 can traverse a spiral path over the outlet 208, starting from the periphery of the DPF filter structure 204 towards the center of the DPF filter structure 204. As another example, the fluid nozzle 306 can traverse multiple concentric paths over the outlet 208. In one example, the fluid nozzle 306 can be incrementally moved radially towards the center of the DPF filter structure 204 after each complete rotation of the DPF filter structure 204. The fluid nozzle 306 is connected to a fluid supply line 308, which can provide fluid to the fluid nozzle 306. The fluid supply line 308 can be coupled to a fluid supply such as an air compressor in instances where the fluid is air, or to a water pump in instances where the fluid is water.

Figure 4:
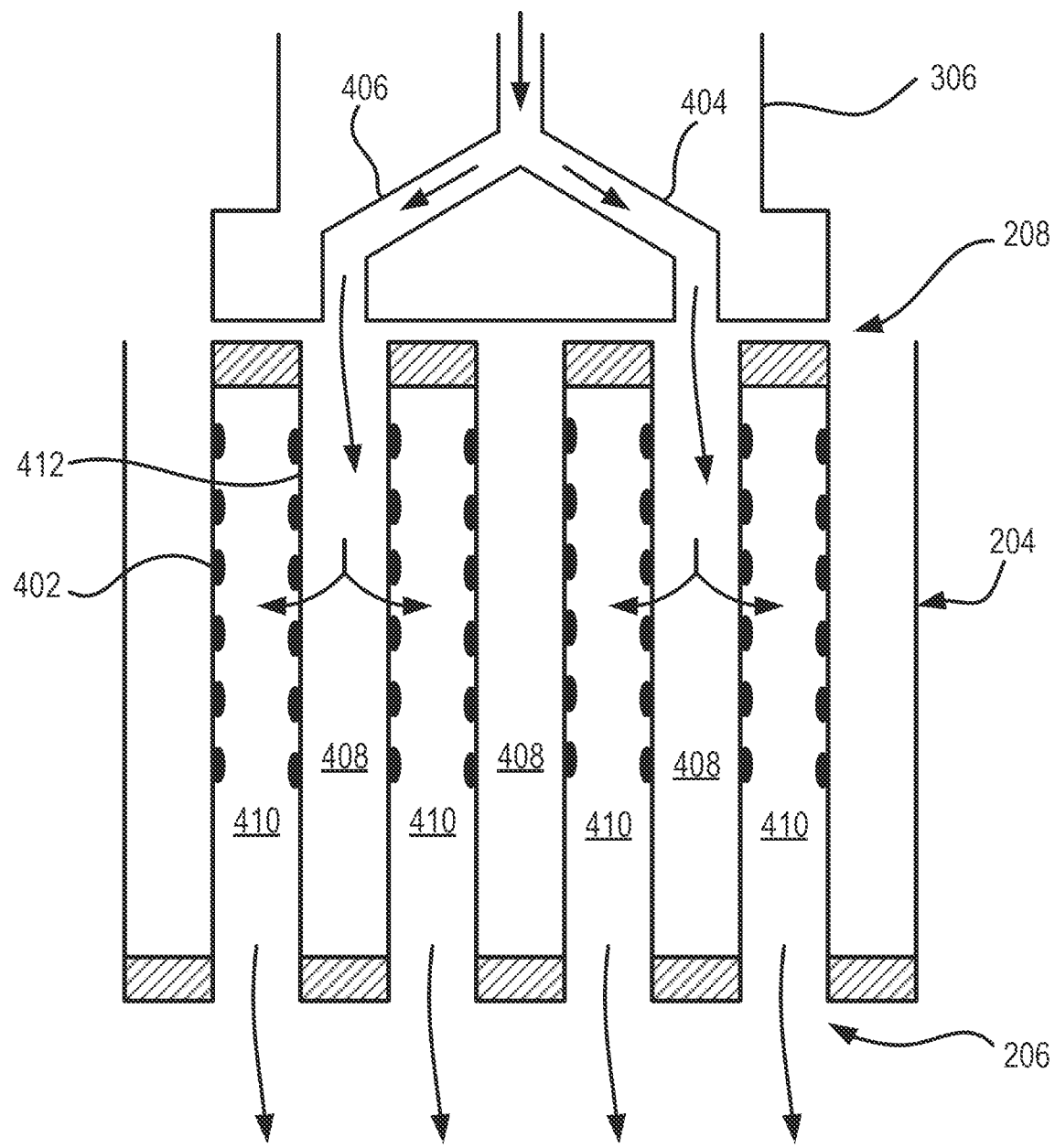
FIG. 4 depicts a cross-section view of a portion of the system shown in FIG. 1.

FIG. 4 depicts a cross-section view of a portion of the system 300 shown in FIG. 3. In particular, FIG. 4 shows an instance where the fluid used for cleaning the DPF filter structure 204 is a liquid, such as, for example, water. The portion of the DPF filter structure 204 shown in FIG. 4 includes a first set of outlet channels 408 separated from a first set of inlet channels 410 by a filter barrier 412. As mentioned above, the particulate matter 402 is disposed predominantly on the filter barrier 412 within the inlet channels 410. The fluid nozzle 306 is positioned over and in contact with the outlet 208 of the DPF filter structure 204. The fluid nozzle 306 includes at least two channels (e.g., a first channel 404 and a second channel 406) that have respective openings on one end of the fluid nozzle 306. In one example, a distribution of fluid flow from the fluid nozzle 306 can be greater than three times an average output channel diagonal to reduce localized high pressure points and improve distribution of fluid.

During a cleaning operation, liquid can be passed through the first channel 404 and the second channel 406 in the fluid nozzle 306 and injected into the outlet channels 408 of the DPF filter structure 204. The liquid can be ejected out the fluid nozzle 306 at a selected pressure, volume, and velocity. As an example, the liquid can be ejected out of the fluid nozzle 306 at a pressure between 30 pounds-per-square-inch (psi) and 350 psi, and at a flow rate between 0.5 cubic-feet-per-minute (CFM) and 35 CFM. The pressure, volume, and velocity of the liquid ejecting out of the fluid nozzle 306 can be selected to ensure that that the flow of liquid is strong enough to dislodge the particulate matter 402 adhered to the filter harrier 412 within the inlet channels 410 without compromising the structural stability of the DPF filter structure 204. The liquid from the fluid nozzle 306 is injected into the outlet channels 408 such that the outlet channels 408 are flooded with the injected liquid. The pressure and velocity with which the liquid is injected into the outlet channels 408 causes the liquid to pass through the filter barrier 412 and into the respective adjacent inlet channels 410. The passage of the liquid through the filter barrier 412 dislodges the particulate matter 402 adhered to the filter barrier 412 within the inlet channels 410. The liquid in the inlet channels 410 is allowed to flow out thought the inlet 206 along with the dislodged particulate matter 402. In this manner, the kinetic energy of the injected liquid can be used to dislodge the particulate matter 402 adhered to the filter barrier 412, The liquid is injected into the outlet channels 408 in a manner such that not all outlet channels 408 around a single inlet channel 410 are flooded with the injected liquid. This can ensure that the structural stability of the filter barriers 412 of the single inlet channel 410 are not compromised due to excessive liquid pressure and flow.

After injecting the liquid into a first set of outlet channels 408, the platform 302 and/or the fluid nozzle 306 can be operated to position of the fluid nozzle 306 over a second set of outlet channels 408. The position of the fluid nozzle 306 can be repeatedly changed such that the liquid is injected into potentially all of the outlet channels 408 exposed at the outlet 208 of the DPF filter structure 204.

The fluid nozzle 306 can be maintained in constant contact with the outlet 208. This can have the advantage of reducing over spray, which can occur in instances where liquid is sprayed onto the entire surface of the outlet 208. The reduction in overspray can reduce wear and tear of the DPF housing 202. Further, the size of the equipment, such as, for example, the pump supplying the liquid, can be of smaller size compared to that utilized if the entire surface of the outlet 208 were to be simultaneously sprayed with liquid.

Figure 5:
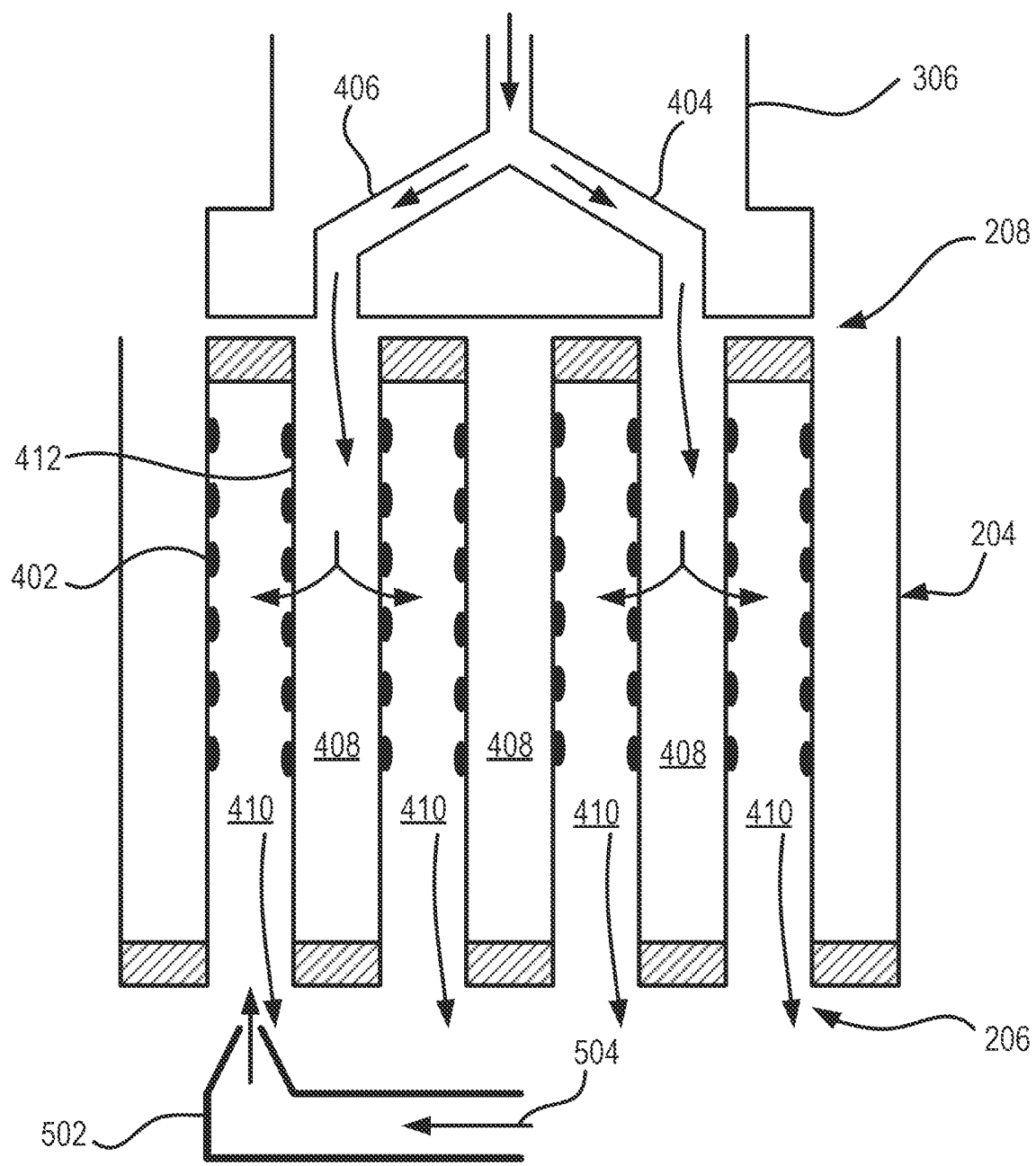
FIG. 5 depicts a cross-section view of another portion of the system shown in FIG. 3.

FIG. 5 depicts a cross-section view of a portion of the system 300 shown in FIG. 3. In particular, FIG. 5 shows an instance where the fluid used for cleaning the DPF filter structure 204 is a gas, such as, for example, air. In addition to the fluid nozzle 306 positioned at the outlet 208 of the DPF filter structure 204, a second nozzle 502 is positioned on the inlet 206 of the DPF filter structure 204. The second nozzle 502 can provide a high velocity narrow jet of air 504 that can be injected into the inlet channels 410. The fluid nozzle 306 can be positioned to make contact with the outlet 208 of the DPF filter structure 204. In some instances, the second nozzle 502 can be positioned at a particular distance from the inlet 206. For example, the second nozzle 502 can be positioned at a distance of 2 to 5 mm from the inlet 206.

The fluid nozzle 306 can provide pulsed compressed air to the outlet 208 of the DPF filter structure 204. The pulsating compressed air can be effective in dislodging the particulate matter 402 adhered to the filter barrier 412 within the inlet channels 410. Positioning the fluid nozzle 306 in contact with the outlet 208 of the DPF filter structure 204 ensures that the compressed air ejected from the fluid nozzle 306 is predominantly directed into the outlet channels 408. As a result, the pressure and volume of compressed air needed to effectively clean the DPF filter structure 204 can be less than that needed if the nozzle were to be positioned at a large distance away from the outlet 208. For example, a cubic-feet-per-minute (CFM) rating of a compressor providing 90 psi of compressed air can be reduced from 120 CFM to 30 CFM. This reduction in the CFM rating can result in considerable reduction in the size of the compressor needed to provide the compressed air to effectively clean the DPF filter structure 204. Pulsation. of compressed air injected into the outlet channels 408 can improve the removal of the particulate matter 402 from the filter harrier 412, compared to non-pulsating compressed air. Moreover, the using pulsating compressed air can further reduce the required size of the compressor.

The second nozzle 502 can provide a high velocity low volume air, et to the inlet channels 410. As an example, the second nozzle 502 can provide a jet of air with a line pressure between 30 psi and 175 psi, and at a flow rate between 10 and 60 CFM. In some instances, the second nozzle 502 can also be mounted on a moveable arm, similar to that controlling the movement of the fluid nozzle 306. In particular, the moveable arms of the fluid nozzle 306 and the second nozzle 502 can be coordinated such that the second nozzle 502 is positioned over an inlet channel 410 that is adjacent to at least one outlet channel 408 into which pulsed compressed air from the fluid nozzle 306 is injected. In some instances, the second nozzle 502 can have dimensions that can allow the air jet to be injected into a single inlet channel 410. In some other examples, the dimensions of the second nozzle 502 can be selected to generate an air jet that has a width that is greater than the width of the opening of the inlet channel 410, such that the air jet can inject air into more than one inlet channel 410 simultaneously. In some examples, the air jet ejected from the second nozzle 502 can be continuous. In some other examples, the air jet can be pulsed.

During a cleaning operation, the air through the second nozzle 502 can be injected into the inlet channels 410, while the compressed air through the fluid nozzle 306 is turned off. The air jet from the second nozzle 502 can help agitate the particulate matter 402 adhered to the filter barrier 412. After a first period of time that is defined by the rate of movement of the nozzle over the DPF and rate of rotation of the DPF, the compressed air through the second nozzle 502 can be switched off, and the pulsating compressed air from the fluid nozzle 306 can be switched on for a second period of time. The pulsating air from the fluid nozzle 306 can be injected into the outlet channels 408 at high pressure, which causes the compressed air to pass through the filter barrier 412 and into the inlet channels 410. The passage of the compressed air through the filter barrier 412 can dislodge the particulate matter 402 adhered to the filter barrier 412. The flow of the pulsating compressed air through the inlet 206 can carry any dislodged particulate matter out of the DPF filter structure 204. The above process can be repeated several times, such as for example, 3-7 times, for each position of the fluid nozzle 306. That is, the processes of first switching on the high velocity low volume compressed air from the second nozzle 502 into the inlet channels 410 for a first period of time, followed by the switching on of pulsating compressed air from the fluid nozzle 306 into the outlet channels 408 for a second period of time can be repeated several times for a single position of the fluid nozzle 306 over the outlet 208. Thereafter, the platform 302 and/or the moveable arm of the fluid nozzle 306 can be actuated to move the fluid nozzle 306 over another set of outlet channels 408, and the processes of alternating between compressed air from the second nozzle 502 and pulsating compressed air from the fluid nozzle 306 can be repeated several times. In one example, the fluid nozzle 306 can cover the entire outlet 208 in three to five minutes.

The alternating processes of blowing compressed air from the second nozzle 502 into the inlet channels 410 and blowing pulsating compressed air from the fluid nozzle 306 into the outlet channels can improve the dislodging and extraction of particulate matter 402 from the DPF filter structure.

Figure 6:
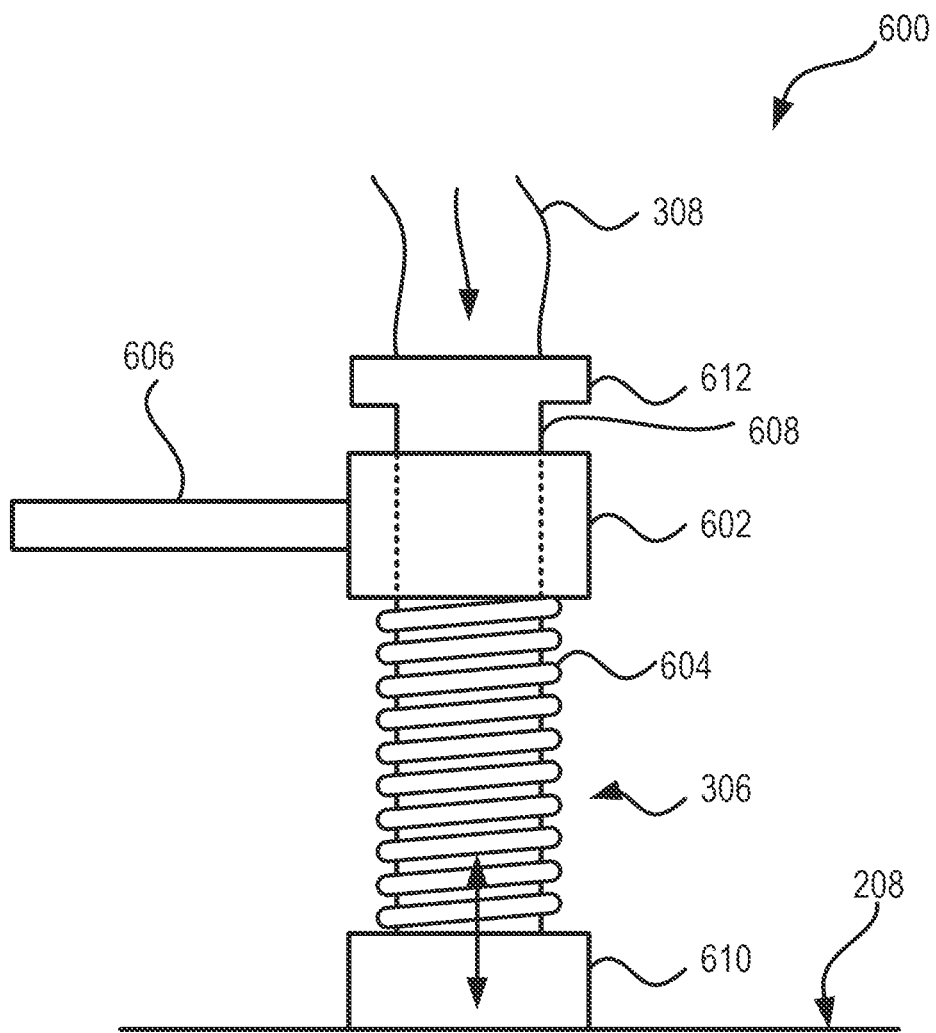
FIG. 6 shows an example fluid nozzle assembly according to an example embodiment.

FIG. 6 shows an example fluid nozzle 306 assembly 600. The assembly 600 can include a moveable arm 606 coupled to a clamp 602. The fluid nozzle 306 includes a first end 610, a second end 612, and an elongated stem portion 608 that extends between the first end 610 and the second end 612. The widths of the first end 610 and the second end 612 can be greater than a width of the elongated stem portion 608. The elongated stem portion 608 can be moveably held by the clamp 602. A spring or other biasing member 604 is disposed around the elongated stem portion 608 between the clamp 602 and the first end 610 of the fluid nozzle 306. In some instances, the surface of the outlet 208 of the DPF filter structure 204 can be uneven. The biasing member 604 and the sliding arrangement of the elongated stem portion 608 with the clamp 602 ensures that that the fluid nozzle 306 remains in contact with the outlet 208 during the traversal of the uneven surface of the outlet 208.

Figure 7:
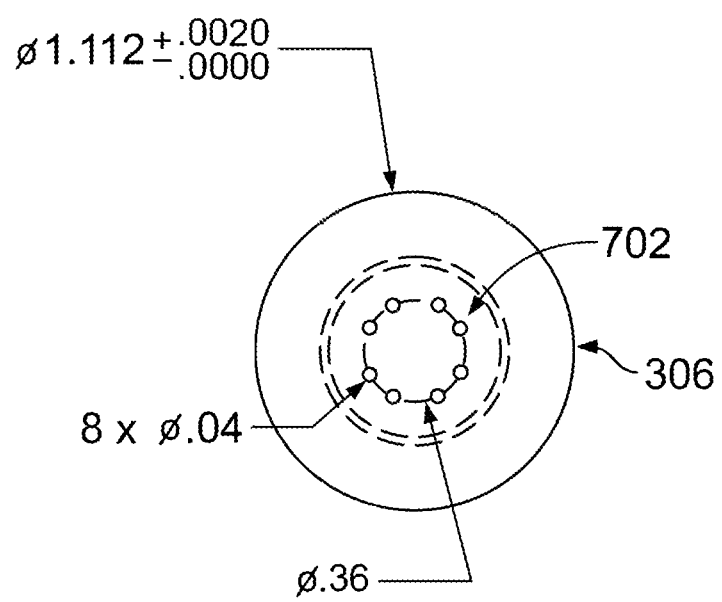
FIG. 7 shows a bottom view of an example fluid nozzle according to an example embodiment.

FIG. 7 shows a bottom view of an example fluid nozzle 306. The fluid nozzle 306 includes eight openings though which fluid can be injected into the outlet channels 408 of the DPF filter structure 204. In some instances, the number of openings can be greater than or less than the eight shown in FIG. 7. The eight openings are arranged in a circular fashion on the bottom surface of the fluid nozzle 306. In some examples, the openings can be arranged in a grid fashion, similar to the grid arrangement of the outlet channel openings 210 of the DPF filter structure 204 shown in FIG. 2. The diameter of each opening 702 can be between 0.02 inches and 0.06 inches, or 0.04 inches. The diameter of the circle defined by the arrangement of the openings 702 can be between 0.4 inches and 0.32 inches, or 0.36 inches. The diameter of the fluid nozzle 306 can be between 0.9 inches and 1.2 inches, or 1.112 inches. It should be noted that these dimensions are only examples, and that the fluid nozzle 306 is not limited to these dimensions.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The term "fluidly connected" and the like, as used herein, mean the two components or objects have a pathway formed between the two components or objects in which a fluid, such as air, oil, fuel, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary. Also, the term "or" is used in its inclusive sense (and not in its exclusive sense) so that when used, for example, to connect a list of elements, the term "or" means one, some, or all of the elements in the list.

What is claimed is:

1. A method for cleaning a particulate filter having an outlet and an inlet, the outlet including openings to a plurality of outlet channels, the inlet including openings to a plurality of inlet channels, the outlet channels being separated from the inlet channels by a filter barrier, the method comprising:
    positioning a fluid nozzle in contact with the outlet of the particulate filter over a first set of outlet channels, the fluid nozzle comprising:
        a first end in communication with a fluid source,
        a second end adjacent to the outlet,
        an elongated stem extending between the first end and the second end,
        a clamp positioned around the elongated stem and adjacent to the first end, and
        a movable arm coupled to and extending from the clamp;
    injecting a fluid from the fluid nozzle into the first set of outlet channels; and
    repositioning the fluid nozzle after injecting the fluid into the first set of outlet channels so as to cause translation of the clamp along the elongated stem.

2. The method of claim 1, further comprising, while injecting fluid from the fluid nozzle, varying a position of the fluid nozzle over the outlet to a second set of outlet channels.

3. The method of claim 1, wherein the fluid comprises a liquid.

4. The method of claim 2, wherein injecting fluid from the fluid nozzle comprises injecting a liquid at a pressure between 15 pounds-per-square-inch and 300 pounds-per-square-inch.

5. The method of claim 1, wherein the fluid nozzle further comprises a biasing member positioned between the clamp and the second end.

6. The method of claim 1, wherein the fluid comprises air.

7. The method of claim 6, wherein the fluid nozzle is a first fluid nozzle, and wherein the method further comprises:
positioning a second fluid nozzle at the inlet of the particulate filter;
injecting a continuous stream of air from the second fluid nozzle into a first subset of inlet channels, at least one inlet channel of the first subset of inlet channels being adjacent to at least one outlet channel of the first set of outlet channels;
wherein injecting fluid from the first fluid nozzle into the first set of outlet channels includes injecting pulsed compressed air into the first subset of inlet channels.

8. The method of claim 2, further comprising:
positioning the particulate filter upon a platform, the platform configured to rotate in a first direction;
wherein varying the position of the fluid nozzle over the outlet to the second set of outlet channels includes actuating the movable arm to move the fluid nozzle in a linear direction over the outlet channels includes actuating the arm to move the fluid nozzle in a linear direction over the outlet while the platform is rotating.

9. A method for cleaning a particulate filter having an outlet and an inlet, the outlet including openings to a plurality of outlet channels, the inlet including openings to a plurality of inlet channels, the outlet channels being separated from the inlet channels by a filter barrier, the method comprising:
positioning a first fluid nozzle in contact with the outlet of the particulate filter over a first set of outlet channels, the first fluid nozzle comprising:
a first end in communication with a fluid source,
a second end adjacent to the outlet,
an elongated stem extending between the first end and the second end,
a clamp positioned around the elongated stem and adjacent to the first end, and
a movable arm coupled to and extending from the clamp;
positioning a second fluid nozzle adjacent to the inlet of the particulate filter over a first inlet channel;
injecting a first fluid from the first fluid nozzle into the first set of outlet channels;
repositioning the first fluid nozzle after injecting the first fluid into the first set of outlet channels so as to cause translation of the clamp along the elongated stem; and
injecting a second fluid from the second fluid nozzle into the first inlet channel;
wherein:
the first fluid is injected from the first fluid nozzle when the second fluid nozzle is not operating; or
the second fluid is injected from the second fluid nozzle when the first fluid nozzle is not operating.

10. The method of claim 9, wherein the second fluid nozzle is positioned opposite the first fluid nozzle.

11. The method of claim 10, wherein the first fluid is injected from the first fluid nozzle when the second fluid nozzle is not operating.

12. The method of claim 10, wherein the second fluid is injected from the second fluid nozzle when the first fluid nozzle is not operating.

13. The method of claim 10, further comprising:
alternating between a first operational mode and a second operational mode, the first operational mode comprising injecting the first fluid from the first fluid nozzle when the second fluid nozzle is not operating, the second operational mode comprising injecting the second fluid from the second fluid nozzle when the first fluid nozzle is not operating.

14. The method of claim 13, wherein the first fluid is a liquid and the second fluid is air.

15. The method of claim 13, further comprising:
positioning the particulate filter upon a platform, the platform configured to rotate in a first direction;
actuating the movable arm to vary a position of the first fluid nozzle over the outlet to a second set of outlet channels; and
rotating the platform in the first direction to vary the position of the second fluid nozzle over the inlet to a second inlet channel.

16. A system, comprising:
a filter housing having a top portion and a bottom portion, the filter housing configured to surround a particulate filter having an outlet and an inlet, the outlet including openings to a plurality of outlet channels, the inlet including openings to a plurality of inlet channels, the outlet channels being separated from the inlet channels by a filter barrier;
a platform coupled to the bottom portion, the platform defining an opening adjacent to the inlet when the particulate filter is surrounded by the filter housing;
a first fluid nozzle positioned in contact with to the outlet when the particulate filter is surrounded by the filter housing, the first fluid nozzle in fluid communication with a first fluid source, the first fluid nozzle comprising:
a first end in communication with the first fluid source,
a second end adjacent to the outlet,
an elongated stem extending between the first end and the second end,
a clamp positioned around the elongated stem and adjacent to the first end such that repositioning of the first fluid nozzle along the outlet causes translation of the clamp along the elongated stem, and
a movable arm coupled to and extending from the clamp; and
a second fluid nozzle positioned adjacent to the inlet when the particulate filter is surrounded by the filter housing, the second fluid nozzle in fluid communication with a second fluid source.

17. The system of claim 16, wherein the first fluid nozzle further comprises a biasing member positioned between the clamp and the second end.

18. The system of claim 17, wherein the biasing member biases the second end toward the outlet so as to maintain contact between the second end and the outlet when the particulate filter is surrounded by the filter housing.

19. The system of claim 18, wherein the first fluid nozzle is configured to direct a fluid into the outlet when the particulate filter is surrounded by the filter housing.

20. The system of claim 16, wherein the second fluid nozzle is configured to direct a fluid into the inlet when the particulate filter is surrounded by the filter housing.

* * * * *